United States Patent [19]

Yukuta et al.

[11] 4,066,579
[45] Jan. 3, 1978

[54] FLAME- AND SMOKE-RESISTANT FLEXIBLE POLYURETHANE FOAM AND A METHOD FOR PRODUCING SAID FOAM

[75] Inventors: Toshio Yukuta, Tokyo; Takashi Ohashi, Iruma; Minoru Kojima; Akira Suzuki, both of Tokyo; Yoshiko Taniguchi, Tokyo, all of Japan

[73] Assignee: Bridgestone Tire Company Limited, Tokyo, Japan

[21] Appl. No.: 563,234

[22] Filed: Mar. 28, 1975

[30] Foreign Application Priority Data

Mar. 30, 1974 Japan .................................. 49-35138
May 31, 1974 Japan .................................. 47-61528

[51] Int. Cl.² .................... C08G 18/14; C08G 18/32; C08G 18/48
[52] U.S. Cl. ...................... 260/2.5 AP; 260/DIG. 24
[58] Field of Search ................................. 260/2.5 AP

[56] References Cited

U.S. PATENT DOCUMENTS

| | | | |
|---|---|---|---|
| 3,072,582 | 1/1963 | Frost | 260/2.5 AP |
| 3,268,488 | 8/1966 | Heiss | 260/2.5 AP |
| 3,322,698 | 5/1967 | Wiles et al. | 260/2.5 AP |
| 3,380,967 | 4/1968 | Lowe et al. | 260/2.5 AP |
| 3,467,606 | 9/1969 | Rice | 260/2.5 AP |
| 3,772,222 | 11/1973 | Steward et al. | 260/2.5 AP |
| 3,803,064 | 4/1974 | Fishbein et al. | 260/2.5 AP |
| 3,804,782 | 4/1974 | Demon et al. | 260/2.5 AP |
| 3,832,311 | 8/1974 | Windemuth et al. | 260/2.5 AP |
| 3,839,242 | 10/1974 | Haber et al. | 260/2.5 AP |

*Primary Examiner*—H.S. Cockeram
*Attorney, Agent, or Firm*—Sughrue, Rothwell, Mion, Zinn and Macpeak

[57] ABSTRACT

An excellent flame- and smoke-resistant flexible polyurethane foam is produced by reacting a polyisocyanate with a mixture of

A. polyether polyol containing secondary hydroxyl group of at least 50 mol% of total hydroxyl content and having a number average molecular weight of 3,000–6,000 and B. a low molecular weight polyhydroxyl compound, an equivalent weight ratio of said low molecular weight polyhydroxyl compound (B) to said polyether polyol (A) being 0.5–2.0, if desired, the flame retardancy of the foam may be enhanced by the addition of a small amount of flame retardant.

4 Claims, 4 Drawing Figures

FIG_1a

| Example 1 | Example 2 | Example 3 | Time |
|---|---|---|---|
|  |  |  | 0 second |
|  |  |  | 10 seconds |
|  |  |  | 20 seconds |
|  |  |  | State of foam after 20 seconds |

FIG_1b

| Example 4 | Example 5 | Example 6 | Time |
|---|---|---|---|
|  |  |  | 0 second |
|  |  |  | 10 seconds |
|  |  |  | 20 seconds |
|  |  |  | State of foam after 20 seconds |

FIG_1c

| Comparative Example 1 | Comparative Example 2 | Time |
|---|---|---|
|  |  | 0 second |
|  |  | 10 seconds |
|  |  | 20 seconds |
|  |  | 30 seconds |

# FLAME- AND SMOKE-RESISTANT FLEXIBLE POLYURETHANE FOAM AND A METHOD FOR PRODUCING SAID FOAM

BACKGROUND OF THE INVENTION

1. Field of the Invention

The present invention relates to a flame- and smoke-resistant flexible polyurethane foam and a method for producing said flexible polyurethane foam.

2. Description of the Prior Art

In polyurethane foams, a variety of foams, such as flexible, semi-rigid and rigid polyurethane foams can be obtained depending upon the number of functional groups, molecular weight and skeleton structure of polyhydroxyl compound and polyisocyanate to be used and hence the polyurethane foams have a broad application from domestic use to industrial use. However, in order that the polyurethane foams are fully suitable for these uses, it is preferable that the polyurethane foams are provided with flame resistance in view of safety. Recently, the development of polyurethane foams having smoke resistance and a low toxicity as well as flame resistance, has been strongly urged in cushion materials for a variety of vehicles, buildings and interiors.

Heretofore, various attempts have been made with respect to the method for providing the flame resistance for polyurethane foams. For example, an addition of a phosphorus compound, an addition of a halogen compound and a phosphorus compound, an addition of a metal oxide, such as antimony oxide, or use of a reactive flame retardant can provide a certain degree of flame resistance for the polyurethane foams but the polyurethane foams which have been judged as non-flammable by the burning test (ASTM D-1692-59T), are few. Moreover, in these processes, the amount of the flame retardant added is relatively large, for example, 15–25 parts by weight based on 100 parts by weight of polyol, so that the general physical properties of the foam are not only adversely affected but also the emission of smoke upon burning is increased when no flame retardant is used and there is great problem in view of the smoke emission.

Furthermore, it is effective as a means of providing the flame resistance for the polyurethane foams to introduce ring structure having a heat resistance, such as isocyanurate ring structure or imide ring structure into polyurethane molecule, but in this case the resulting foam is apt to become a rigid foam and it has been impossible to obtain a flexible foam, particularly a flexible foam having desirable properties and further a black smoke is liable to be emitted upon burning and such a foam is not desirable.

Namely, in the conventional processes, it has been difficult to provide both the properties of high flame resistance and smoke resistance for the polyurethane foam without adversely affecting the general physical properties of the polyurethane foam.

SUMMARY OF THE INVENTION

The present invention is to provide a flame- and smoke-resistant flexible polyurethane foam produced by reacting a polyisocyanate in the presence of a surfactant, catalysts, blowing agents and the other additives, with a mixture of A. a polyether polyol containing secondary hydroxyl group of at least 50 mol% of total hydroxyl content and having a number average molecular weight ranging 3,000–6,000, and B. a low molecular weight polyhydroxyl compound, an equivalent weight ratio of said low molecular weight polyhydroxyl compound (B) to said polyether polyol (A) being 0.5–2.0, if desired the flame retardancy of the foam may be enhanced by the addition of a small amount of flame retardant.

Another aspect of the present invention is to provide a method for producing a flame- and smoke-resistant flexible polyurethane foam by reacting a polyisocyanate in the presence of a surfactant, catalysts, blowing agents and the other additives with a mixture of A. a polyether polyol containing secondary hydroxyl group of at least 50 mol% of total hydroxyl content and having a number average molecular weight of 3,000–6,000, and B. a low molecular weight polyhydroxyl compound, an equivalent weight ratio of said low molecular weight polyhydroxyl compound (B) to said polyether polyol (A) being 0.5–2.0.

An object of the present invention is to provide a flame- and smoke-resistant flexible polyurethane foam.

Another object of the present invention is to provide an excellent flame- and smoke-resistant flexible polyurethane foam having excellent general physical properties.

The present invention can produce a polyurethane foam having high flame- and smoke-resistance, which cannot be expected from the conventional techniques for producing, so called, hot cure flexible polyurethane foams.

Furthermore, the present invention can increase the flame resistance while retaining the smoke resistance by the addition of a small amount of a flame retardant which small amount has never been foreseen in the conventional flame retarding techniques.

In addition, according to the present invention, polyether polyols ordinarily used in the production of flexible polyurethane foams in the conventional hot cure system can be used, so that the present invention is very advantageous in view of the material cost.

PHOTOGRAPHS AND DIAGRAM

DETAILED DESCRIPTION OF THE PREFERRED EMBODIMENTS

The polyhydroxyl compounds to be reacted with the polyisocyanate in the method of the present invention are a mixture of a polyether polyol (A) and a low molecular weight polyhydroxyl compound (B) and the polyether polyols of the component (A) of the present invention are those containing secondary hydroxyl group of at least 50 mol% of total hydroxyl content and having a number average molecular weight ranging from 3,000 to 6,000 obtained, for example, by subjecting a polyhydroxyl compound, such as ethylene glycol, glycerin, trimethylolpropane, pentaerythritol, etc. to the reaction with alkylene oxide, such as ethylene oxide, propylene oxide, etc., rendering the latter the ring opening addition polymerization in the presence of an alkali catalyst. These polyether polyols are used for the production of general flexible polyurethane foams and particularly poly(oxypropylene) triol obtained by reacting glycerin with polypropylene oxide is preferable.

The low molecular weight polyhydroxyl compounds of the component (B) of the present invention are preferred to be, for example, aliphatic alcohols, such as ethylene glycol, propylene glycol, diethylene glycol, butanediol, glycerin, trimethylolpropane, triethylolpropane, trimethylolethane, triethylolethane, pentaerythritol, 1,2,6-hexanetriol and particularly glycerin and trimethylolpropane are preferable.

On the contrary, when aliphatic aminoalcohols, such as ethanolamine, diethanolamine, triethanolamine, N,N,N¹,N¹-tetrakis(2-hydroxypropyl)-ethylenediamine, etc. are used as the low molecular weight polyhydroxyl compound, the resulting foam is apt to ignite and the object of the present invention cannot be fully attained.

When these low molecular weight polyhydroxyl compounds (B) are liquid at room temperature, these compounds are previously mixed with the polyether polyol (A) or these compounds are simultaneously added with the other components upon foaming. When these compounds are wax or crystal solid at room temperature, these compounds (B) are previously mixed with or dissolved in the polyether polyol (A), water or the other components to form a homogeneous solution. Alternatively when these compounds (B) are simultaneously added with the other components by, so called, one shot process, it is preferable that these compounds (B) are previously melted by heating and then added in a liquid form.

The equivalent weight ratio of said low molecular weight polyhydroxyl compound (B) to said polyether polyol (A) is 0.5-2.0. When the amount is less than 0.5, the foam becomes flammable and when the amount becomes more than 2.0, a favorable foam cannot be obtained and the resulting foam is liable to show a considerable shrinking phenomenon and further becomes flammable. Particularly, the use amount of 0.7-1.5 equivalent weight ratio is preferable.

As the polyisocyanate to be used in the present invention, in general, mention may be made of tolylene diisocyanate. Tolylene diisocyanate wherein 2,4- and 2,6-isomers of isocyanate group are mixed in a mixture ratio of 80/20 or 65/35, is preferable in view of a low cost and utility. Furthermore, as the other polyisocyanates, use may be made of pure or crude diphenylmethane diisocyanate, diphenyl diisocyanate, chlorophenyl-2,4-diisocyanate, p-phenylene diisocyanate, xylene diisocyanate and polymethylene-polyphenylene isocyanate or mixtures of these polyisocyanates and tolylene diisocyanate.

An amount of polyisocyanate used based on the total amount of the polyhydroxyl compound and the compound having the other active hydrogen, that is, the isocyanate index (NCO index) is in the range of 80-130 but when considering the balance of the flame resistance and the smoke resistance to the general physical properties of the produced flexible polyurethane foam, the isocyanate index is particularly preferred to be in the range of 95-110.

The surfactants to be used in the method of the present invention are silicone surfactants selected from siloxane-oxyalkylene block copolymers to be heretofore used for the production of polyurethane foam and the similar substances. These silicone surfactants are colorless or light yellow liquid having a specific gravity of 0.765-1.068 when measured by JIS Z-8804 process and a viscosity of not more than 400 centistrokes when measured by JIS Z-8803 process. As long as the object of the present invention are not damaged, the kind and the amount of said silicone surfactants are not limited but when the silicone surfactants in which the oxyalkylene component in the siloxane-oxyalkylene block copolymer is ethylene oxide, that is, the silicone surfactants for semi-rigid, rigid polyetherurethane foam, and polyesterurethane foam, are used alone or in admixture, the good result can be obtained.

As the embodiments of the silicone surfactant for semi-rigid, rigid polyetherurethane foam, and polyesterurethane foam, the surfactants commercially available under following trade marks are listed. For example, the silicone surfactants for semi-rigid polyetherurethane foam are SRX-253, SRX-274A, SRX-274B, SRX-274C, SH-200 (these surfactants are made by Toray Silicone Co.), L-5305 (made by UCC). The silicone surfactants for rigid polyetherurethane foam are SRX-295, SH-193 (they are made by Toray Silicone Co.), DC-193, DC-195 (they are made by Dow Corning Corp.), SF-1066, SF-1079, SF-1109, SF-1158 (they are made by General Electric Corp.), L-530, L-531, L-5310, L-5320, L-5340, L-5410 (they are made by UCC). The silicone surfactants for polyesterurethane foam are L-532 (made by UCC) and DC-1312 (made by Dow Corning Corp.).

In general, in the production of flexible polyurethane foams, it is common knowledge that the silicone surfactants for the flexible polyurethane foam maybe used as the surfactant and however the inventors have found that the silicone surfactants for semi-rigid or rigid polyurethane foams are particularly useful for the production of the flexible polyurethane foams of the present invention and that the resulting flexible polyurethane foams are provided with high flame resistance and smoke resistance and this is a particularly noticeable fact in the present invention.

The above described silicone surfactants can be used in an amount of 0.05-5.0 parts by weight based on 100 parts by weight of polyether polyol (A) and particularly, the use of 1.0-3.0 parts by weight provides the good foam.

Any catalysts which can be used for the conventional production of the flexible polyurethane foam may be used for the method of the present invention. That is, amine catalysts, tin catalysts and the mixtures thereof can be used. As the amine catalysts, mention may be made of triethylamine, triethylenediamine, dimethylethanolamine, N-methylmorpholine, N-ethylmorpholine, bis(β-dimethylaminoethyl)ether, etc.

As the tin catlaysts, mention may be made of carboxylic acid salts of bivalent or tetravalent tin, such as stannous octoate or dibutyltin dilaurate.

An amount of these catalyts used is generally within a range of 0.05-1.0 parts by weight based on 100 parts by weight of the polyether polyol (A).

As the blowing agents to be used in the method of the present invention, use may be made of water or a volatile liquid having a low boiling point. The volatile liquid having a low boiling point includes, for example, trichloromonofluoromethane, dibromodifluoromethane, dichlorodifluoromethane, dichlorotetrafluoroethane, monochlorodifluoromethane, trifluoroethylbromide, dichloromethane, etc. and these blowing agents may be used alone or in admixture.

An amount of these blowing agents used is 2.0-20.0 parts by weight based on 100 parts by weight of the polyether polyol (A).

In the present invention, a higher flame resistance can be given to the polyurethane foam without affecting the general physical properties of the foam adversely and increasing the smoke emission upon burning of the foam by adding a small amount of a flame retardant, if necessary, in addition to the above described components.

As the flame retardants to be used in the present invention, use may be made of various addition type or reaction type of flame retardants which are used as the conventional flame retardants for flexible polyurethane foams but halogenated phosphoric acid ester is preferable in view of the production cost or the physical properties of foam. The halogenated phosphoric acid esters include, for example, tris(2-chloroethyl) phosphate, tris(2-chloropropyl) phosphate, tris(2,3-dichloropropyl) phosphate, tris(2-bromopropyl) phosphate, tris(2,3-dibromopropyl) phosphate, tris(bromochloropropyl) phosphate, dichloropropyl-bis(dibromopropyl) phosphate, poly-$\beta$-chloroethyl-triphosphonate, etc. Among them, tris(2,3-dichloropropyl) phosphate and tris(2,3-dibromopropyl) phosphate are particularly preferable. An amount of the halogenated phosphoric acid ester used in the present invention is not more than 10 parts by weight based on 100 parts by weight of the polyether polyol (A) and preferably 0.5-10 parts by weight. In an amount of more than 10 parts by weight, the object of the present invention can be attained but the physical properties of the foam are deteriorated.

In the present invention, a cross-linking agent, a filler, a reinforcing agent, a pigment or similar substances thereof may be added other than the above described components.

The production of the flexible polyurethane foams according to the present invention can be carried out by the usually conducted process. For example, one shot process, wherein to a homogeneous mixed solution of the polyhydroxyl compound, water and/or a blowing agent, catalysts, a silicone surfactant, a flame retardant and the other additives is added the polyisocyanate to cause reaction and foaming, and two stage process, wherein a part or the total amount of the polyhydroxyl compound is previously reacted with the total amount of polyisocyanate to form prepolymer and then the prepolymer is mixed with the other components to cause foaming, are usually adopted.

The polyurethane foams produced by the method of the present invention are flexible polyurethane foams having a density of 20-50 Kg/m³. If desired, the density of the foam can be further controlled by adding water, the other blowing agent or with the variation of the use amount and kind of a low molecular weight polyhydroxyl compound, polyol and polyisocyanate.

The flame- and smoke-resistant flexible polyurethane foams obtained by the present invention are useful for sheet cushion materials in various vehicles, aircrafts, and ships and materials of various buildings, furnitures and interiors.

The following examples are given for the purpose of illustration of this invention and are not intended as limitations thereof. In the examples, "parts" means parts by weight.

EXAMPLE 1

A mixture of 100 parts of poly(oxypropylene) triol GP-3000 (hydroxyl value: 56, molecular weight: about 3,000, made by Sanyo Kasei Co.) as a component (A), 3.0 parts of trimethylolpropane as a component (B), which was previously melted at about 60° C, the equivalent weight ratio of the component (B) to the component (A) being 0.68, 3.0 parts of water, 0.1 parts of triethylenediamine, 0.3 parts of stannous octoate, 3.0 parts of silicone surfactant SH-193 (a surfactant for rigid polyetherurethane foam, made by Toray Silicone Co.) and 5 parts of trichloromonofluoromethane (F-11, made by Du Pont) was stirred for about 30 seconds to obtain a homogeneous solution. When the solution was stirred at a high speed together with 43.6 parts (NCO index: 100) of tolylene diisocyanate TDI-80 (2,4-isomer:2,6-isomer = 80:20), the reaction mixture is emulsified to become creamy in about 13 seconds. When the creamy mixture was immediately charged into a paper mold, the mixture began to foam, and the rising of foam was completed in about 170 seconds. The resulting flexible polyurethane foam had a uniform cell structure with a little proportion of closed cells, yielding completely open cell-type structure after crushing process.

The burning test of the resulting polyurethane foam according to ASTM D-1692-59T showed that the burning distance of the foam was 3.8 cm and the burning time thereof was 22 seconds and the foam had an excellent self-extinguishing property. The smoke generation coefficient $C_{Amax}$ of the foam was 56.6, when the value of the coefficient measured according to JIS A-1321-1970 was converted to a basis of 30.0 Kg/m³ of foam density.

The physical properties of the polyurethane foam obtained in this Example 1 are shown in the following Table 1 together with the results of the above described burning and smoke tests.

Table 1

|  | Example 1 |
|---|---|
| Density (Kg/m³) | 25.9 |
| Tensile strength (Kg/cm²) | 0.32 |
| Elongation (%) | 80 |
| ILD (Kg/200 mm$\phi$)$^{25\%}$ | 7.5 |
| Compression set (%) (50% deflection, 70° C, 22 hours) | 9.1 |
| Resilience (%) | 25 |
| Burning test (ASTM D-1692-59T) | self-extinguishing |
| Smoke test (JIS A-1321-1970) Smoke coefficient $C_{Amax}$ | 56.6 |

EXAMPLES 2-6

The procedure of Example 1 was repeated, except that the amount of component (B) of trimethylolpropane, silicone surfactant, and isocyanate was varied as shown in the following Table 2, to obtain flexible polyurethane foams.

The results of burning test and smoke test, and the physical properties of the resulting flexible polyurethane foams are also shown in Table 2. As seen from Table 2, all of the resulting flexible polyurethane foams are self-extinguishing, and have a smoke generation coefficient $C_{Amax}$ lower than that of general purpose polyurethane foams shown in the following Comparative Examples 1 and 2.

Table 2

|  | Example 2 | Example 3 | Example 4 | Example 5 | Example 6 |
|---|---|---|---|---|---|
| Compounding recipe (parts) | | | | | |
| (A) Triol GP-3000 | 100 | 100 | 100 | 100 | 100 |
| (B) Trimethylolpropane | *4.4 (1) | *6.6 (1.5) | *4.4 (1) | *4.4 (1) | *4.4 (1) |
| Stannous octoate | 0.3 | 0.1 | 0.3 | 0.3 | 0.1 |
| Triethylenediamine | 0.1 | 0.2 | 0.1 | 0.1 | 0.2 |
| Water | 3.0 | 3.0 | 3.0 | 3.0 | 3.0 |
| Silicone surfactant (SH-193) | 3.0 | 3.0 | 4.0 | 3.0 | 3.0 |
| Trichloromonofluoromethane (F-11) | 5.0 | 5.0 | 5.0 | 5.0 | 5.0 |
| Tolylene diisocyanate (TDI-80) | **46.2 (100) | **50.5 (100) | **46.2 (100) | **43.9 (95) | **48.5 (105) |
| Creaming time (second) | 15 | 12 | 12 | 13 | 12 |
| Rising time (second) | 120 | 120 | 110 | 130 | 90 |
| Burning test (ASTM D-1692-59T) | self-extinguishing | | | | |
| Smoke test (JIS A-1321-1970) | | | | | |
| Smoke coefficient $C_{Amax}$ | 63.7 | 61.0 | 57.8 | 48.1 | 65.4 |
| Physical property | | | | | |
| Density (Kg/m$^3$) | 25.5 | 25.4 | 25.0 | 25.1 | 28.1 |
| Tensile strength (Kg/cm$^2$) | 0.47 | 0.41 | 0.34 | 0.45 | 0.56 |
| Elongation (%) | 98 | 87 | 89 | 108 | 75 |
| ILD (Kg/200 mm$\phi$)$^{25\%}$ | 5.9 | 5.1 | 6.6 | 5.4 | 8.6 |
| Compression set (%) (50% deflection, 70° C, 22 hours) | 21.8 | 20.0 | 9.3 | 15.3 | 8.1 |
| Resilience (%) | 21 | 19 | 25 | 18 | 21 |

*The numeral in the parentheses is the equivalent weight ratio of trimethylolpropane of component (B) to the hydroxyl group of triol of component (A).
**The numeral in the parentheses is the isocyanate index. The isocyanate index is the percentage of the amount of polyisocyanate to the whole amount of hydroxyl compound and other compounds having active hydrogen in equivalent basis.

EXAMPLE 7

A flexible polyurethane foam was produced in the same compounding recipe and procedure as described in Example 1, except that 4.4 parts of glycerin was used as a component (B), the equivalent weight ratio of the component (B) to the component (A) being 1.5, instead of trimethylolpropane used in Example 1, and 50.1 parts (NCO index: 100) of tolylene diisocyanate TDI-80 was used, but trichloromonofluoromethane (F-11) was not used. The creaming time was about 20 seconds, the rising time was about 65 seconds, and the resulting foam had a density of 44 Kg/m$^3$. The burning test and smoke test of the foam effected in the same manner as described in Example 1 showed that the foam was self-extinguishing and the smoke generation coefficient $C_{Amax}$ of the foam was 40.5, when converted to a basis of 30 Kg/m$^3$ of foam density.

EXAMPLE 8

A flexible polyurethane foam was produced in the same procedure as described in Example 1 from 100 parts of poly(oxypropylene) triol GP-3000 as a component (A), 4.4 parts of trimethylolpropane as a component (B) which was previously melted at about 60° C, the equivalent weight ratio of the component (B) to the component (A) being 1, 3.0 parts of water, 0.2 parts of triethylenediamine, 0.1 parts of stannous octoate, 46.2 parts (NCO index: 100) of tolylene diisocyanate TDI-80, and 3.0 parts of silicone surfactant SRX-295 (a surfactant for rigid polyetherurethane foam, made by Toray Silicone Co.). The burning test of the resulting foam effected in the same manner as described in Example 1 showed that the foam was self-extinguishing.

EXAMPLE 9

A flexible polyurethane foam was produced in the exactly same manner as described in Example 8, except that silicone surfactant SRX-253 (a surfactant for semi-rigid polyetherurethane foam, made by Toray Silicone Co.) was used. The burning test of the resulting foam effected in the same manner as described in Example 1 showed that the foam was self-extinguishing.

EXAMPLE 10

A flexible polyurethane foam was produced in the exactly same compounding recipe and procedure as described in Example 8, except that silicone surfactant SRX-274 A (a surfactant for semi-rigid polyetherurethane foam, made by Toray Silicone Co.) was used instead of the silicone surfactant SRX-295 used in Example 8. The resulting flexible polyurethane foam had a density of 29 Kg/m$^3$. The burning test and smoke test of the foam effected in the same manner as described in Example 1 showed that the foam was self-extinguishing and had a smoke generation coefficient $C_{Amax}$ of 40.5, when converted to a basis of 30 Kg/m$^2$ of foam density.

EXAMPLES 11 and 12

Flexible polyurethane foams were produced in the same procedure as described in Example 1 according to the compounding recipes shown in the following Table 3, wherein silicone surfactant L-532 (a surfactant for polyesterurethane foam, made by UCC Co.) was used as a surfactant.

The result of burning test and the physical properties of the resulting foams are also shown in Table 3.

Table 3

|  | Example 11 | Example 12 |
|---|---|---|
| Compounding recipe (parts) | | |
| (A) Triol GP-3000 | 100 | 100 |
| (B) Trimethylolpropane | *4.4(1) | — |
| (B) Glycerin | — | *3.04(1) |
| Stannous octoate | 0.2 | 0.2 |
| Triethylenediamine | 0.1 | 0.1 |
| Water | 2.4 | 2.4 |
| Silicone surfactant (L-532) | 1.5 | 1.5 |
| Tolylene diisocyanate (TDI-80) | **44.5(100) | **44.5(100) |
| Physical property | | |
| Density (Kg/m$^3$) | 36.6 | 38.6 |
| Tensile strength (Kg/cm$^2$) | 1.17 | 0.937 |
| Elongation (%) | 114 | 101 |
| ILD (Kg/200 mm$\phi$)$^{25\%}$ | 8.80 | 8.15 |

Table 3-continued

|  | Example 11 | Example 12 |
|---|---|---|
| Compression set (%) (50% deflection, 70° C, 22 hours) | 5.81 | 5.64 |
| Resilience (%) | 40 | 46 |
| Hysteresis loss (%) | 23.6 | 20.1 |
| Burning test (ASTM D-1692-59T) | non-flammable | self-extinguishing |

*The numeral in the parentheses is the equivalent weight ratio of component (B) to the hydroxyl group of triol of component (A).
**The numeral in the parentheses is the isocyanate index.

COMPARATIVE EXAMPLES 1 AND 2

In order to more clarify the feature of the present invention, conventional polyurethane foams were produced according to the compounding recipes shown in the following Table 4 in the same procedure as described in Example 1.

The results of burning test and smoke test and the physical properties of the resulting foams are also shown in Table 4.

Table 4

|  | Comparative Example 1 | Comparative Example 2 |
|---|---|---|
| Compounding recipe (parts) |  |  |
| (A) Triol GP-3000 | 100 | 100 |
| Stannous octoate | 0.26 | 0.26 |
| Triethylenediamine | 0.1 | 0.1 |
| Water | 4.2 | 4.2 |
| Silicone surfactant (L-520) | 1.7 | — |
| Silicone surfactant (SH-193) | — | 1.7 |
| Tolylene diisocyanate (TDI-80) | *53.6(108) | *53.6(108) |
| Burning test (ASTM D-1692-59T) | flammable | flammable |
| Smoke test (JIS A-1321-1970) |  |  |
| Smoke coefficient $C_{Amax}$ | 82.7 | 86.3 |
| Physical property |  |  |
| Density (Kg/m$^3$) | 27.6 | 29.2 |
| Tensile strength (Kg/cm$^2$) | 0.60 | 0.61 |
| Elongation (%) | 80 | 74 |
| ILD (Kg/200 mm$\phi$)$^{25\%}$ | 16.0 | 23.2 |
| Compression set (%) (50% deflection, 70° C, 22 hours) | 2.5 | 3.3 |
| Resilience (%) | 39 | 30 |

*The numeral in the parentheses is the isocyanate index.

In Comparative Example 1, a flexible polyurethane foam was produced in the same manner as described in Example 1, except that silicone surfactant L-520 (a surfactant for flexible polyurethane foam, made by UCC Co.) was used and a low molecular weight polyhydroxyl compound of component (B) was not used. The resulting foam is a so called general purpose flexible polyurethane foam. The burning test and smoke test of the resulting foam showed that the foam was flammable and had a smoke generation coefficient noticeably higher than that of the foam of the present invention.

In Comparative Example 2, a flexible polyurethane foam was produced in the same manner as described in Example 1, except that a low molecular weight polyhydroxyl compound of component (B) was not used. The resulting foam is flammable and has a smoke generation coefficient higher than that of the foam of the present invention.

Figure 1A:
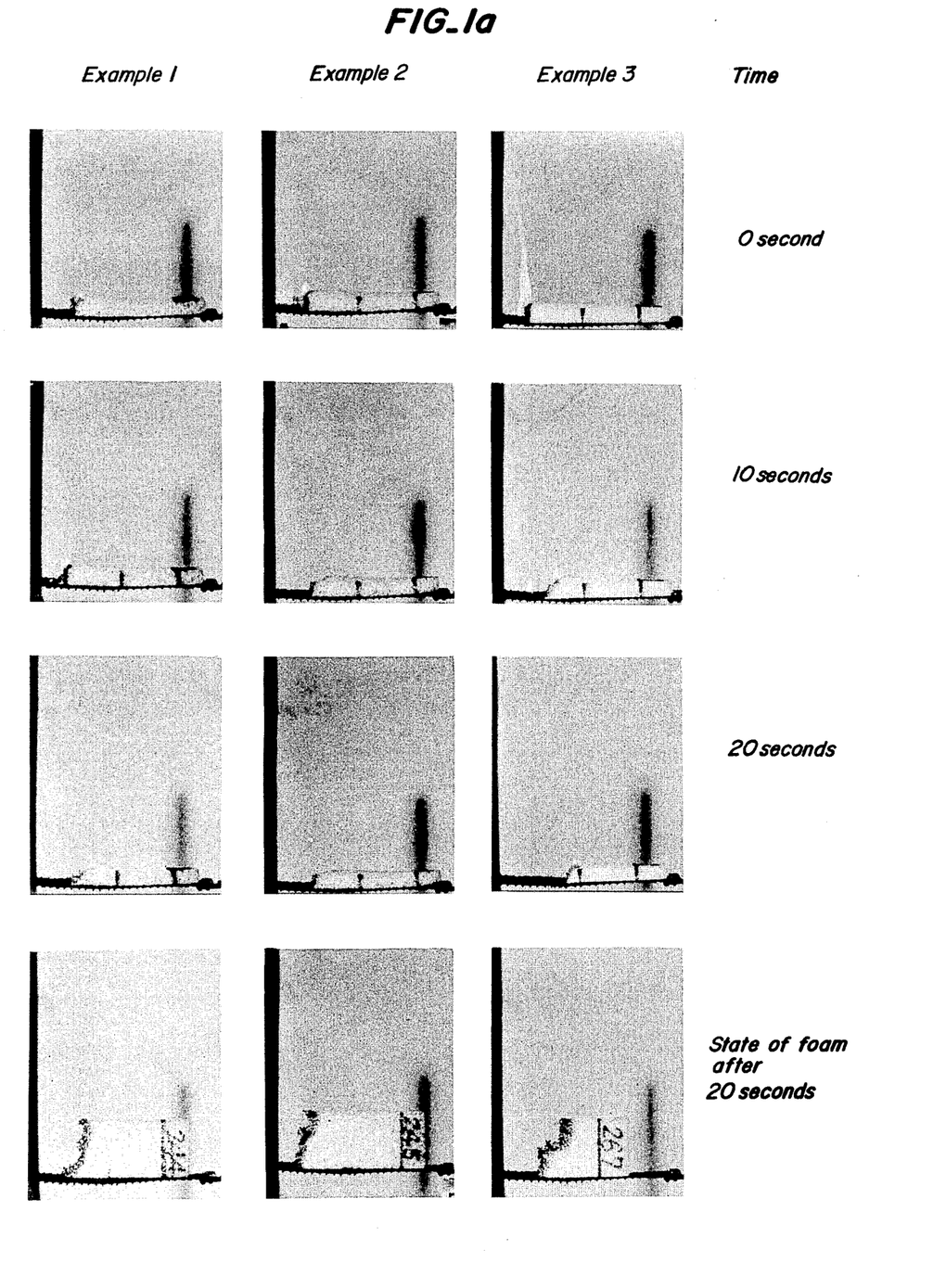
FIGS. 1a, 1b and 1c are photographs showing flammability of the flexible polyurethane foams obtained in the method of the present invention and in Comparative Examples, which has been determined by the burning test (ASTM D-1692-59T)
Figure 1B:
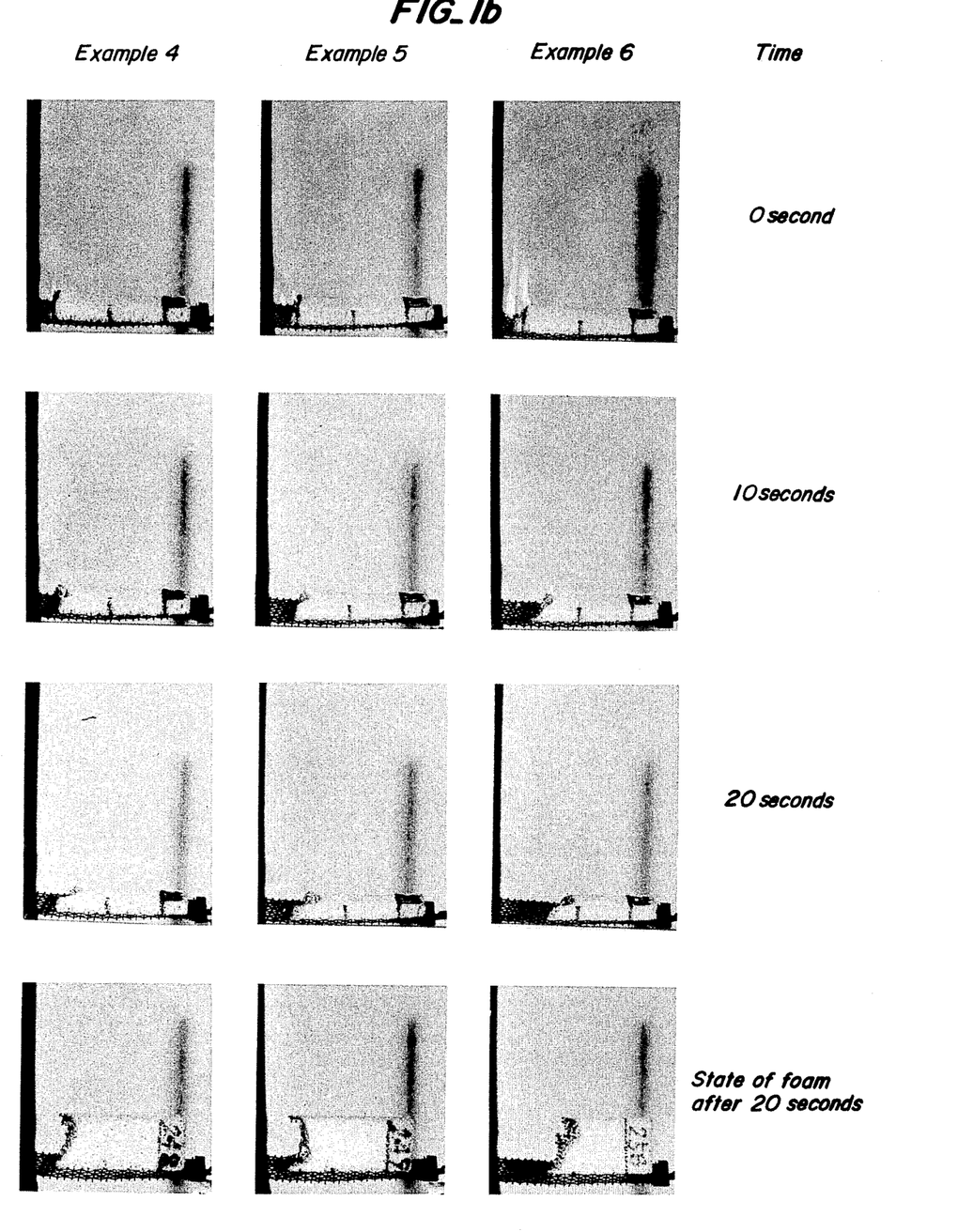
Figure 1C:
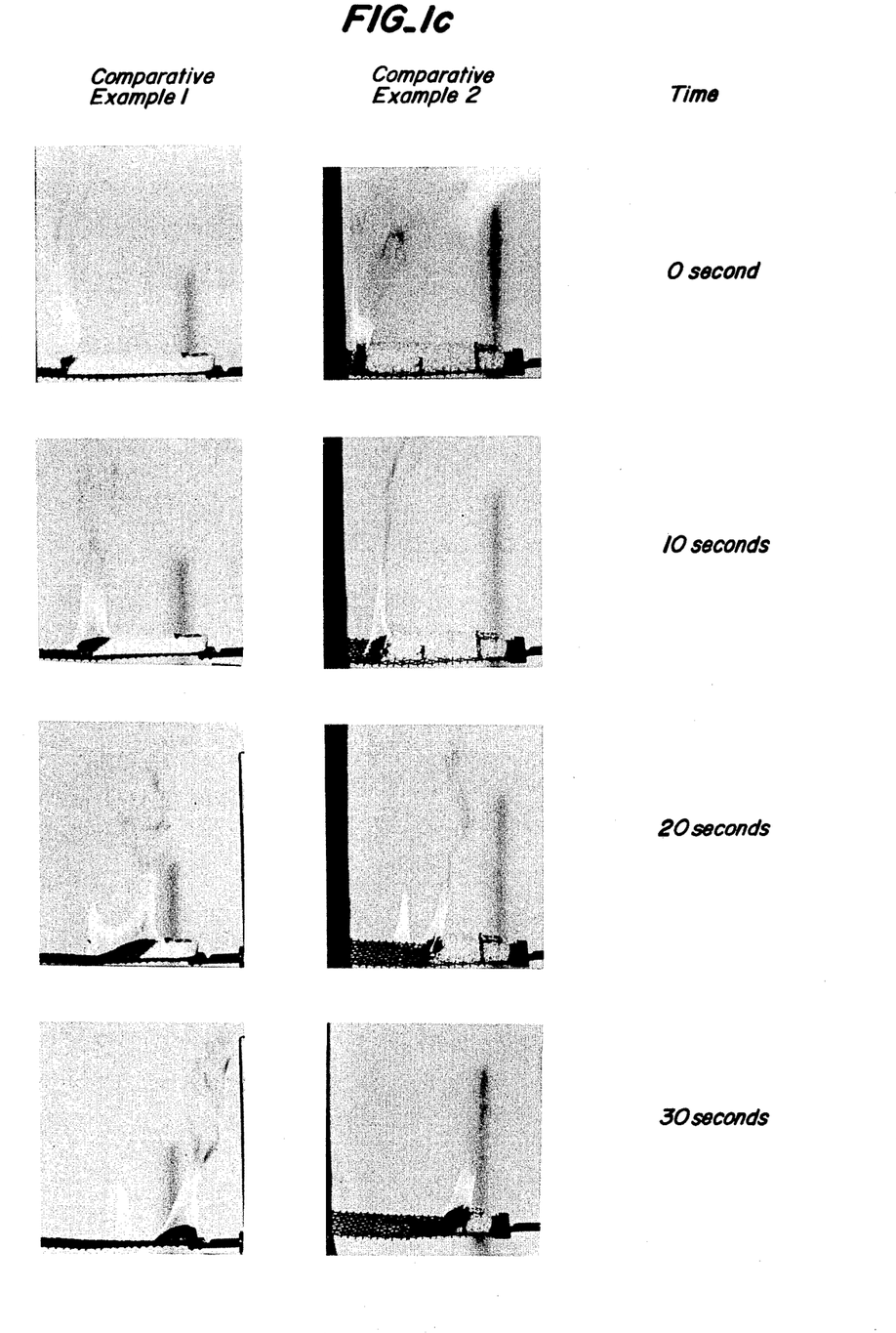

FIGS. 1a, 1b and 1c are photographs showing the burning states in the burning test of the polyurethane foams obtained by the method of the present invention (Examples 1-6), and of the general purpose flexible polyurethane foams obtained by Comparative Examples 1 and 2. The burning test was effected as follows. A foam is ignited by a burner, and when the burning of the foam is reached a base line, this time is adopted as the starting time (0 second) of measurement, and at the same time the burner is kept away from the foam, and then the burning state of the foam after the lapse of predetermined time was observed. The photograph shows the burning state of a foam after the lapse of 0 second, 10 seconds and 20 seconds, and further shows the state of the foam after the lapse of 20 seconds viewed from the upper side.

It can be seen from the photographs of FIGS. 1a, 1b and 1c that the flames of the polyurethane foams of the present invention (Examples 1-6) become smaller with the lapse of time after the starting time of the measurement, and the flames are extinguished after 10 seconds in the earliest case and are extinguished after 20 seconds in the latest case. While, in the polyurethane foams of Comparative Examples 1 and 2, in spite of the fact that the foams are kept away from the burner after the starting time of the measurement, the flames do not become smaller, but rather keep burning while generating large amount of smoke and are finally burnt up. It will be clear from the phenomena that the polyurethane foam of the present invention is excellent in the flame resistance and in the low smoke emission.

COMPARATIVE EXAMPLES 3 AND 4

Polyurethane foams were prepared according to the compounding recipes shown in the following Table 5 in the exactly same procedure as described in Example 1. The burning test of the resulting foams was effected in the same manner as described in Example 1.

The obtained results are also shown in Table 5.

Table 5

|  | Comparative Example 3 | Comparative Example 4 |
|---|---|---|
| Compounding recipe (parts) |  |  |
| (A) Triol GP-3000 | 100 | 100 |
| (B) Trimethylolpropane | *1(0.23) | *10(2.3) |
| Stannous octoate | 0.3 | 0.4 |
| Triethylenediamine | 0.1 | 0.1 |
| Water | 3.0 | 3.0 |
| Silicone surfactant (SH-193) | 3.0 | 3.0 |
| Tolylene diisocyanate (TDI-80) | **39.5(100) | **57.1(100) |
| Burning test (ASTM D-1692-59T) | flammable | flammable |

*The numeral in the parentheses is the equivalent weight ratio of trimethylolpropane of component (B) to the hydroxyl group of triol of component (A).
**The numeral in the parentheses is the isocyanate index.

When the amount of low molecular weight polyhydroxyl compound of component (B), based on 100 parts of triol of component (A), is 1 part (the equivalent weight ratio of the component (B) to the component (A) is 0.23) or 10 parts (the ratio is 2.3), the resulting foams are flammable.

COMPARATIVE EXAMPLES 5 AND 6

Polyurethane foams were produced in the same procedure as described in Example 1, except that the amount of silicone surfactant SH-193 was varied as shown in the following Table 6. The burning test of the foams was effected in the same manner as described in Example 1.

The obtained results are also shown in Table 6.

Table 6

|  | Comparative Example 5 | Comparative Example 6 |
| --- | --- | --- |
| Compounding recipe (parts) | | |
| (A) Triol GP-3000 | 100 | 100 |
| (B) Trimethylolpropane | *4.4(1) | *4.4(1) |
| Stannous octoate | 0.3 | 0.4 |
| Triethylenediamine | 0.1 | 0.1 |
| Water | 3.0 | 3.0 |
| Silicone surfactant (SH-193) | 0.5 | 7.0 |
| Tolylene diisocyanate (TDI-80) | **46.2(100) | **46.2(100) |
| Burning test (ASTM D-1692-59T) | foam cannot be obtained | flammable |

*The numeral in the parentheses is the equivalent weight ratio of trimethylolpropane of component (B) to the hydroxyl group of triol of component (A).
**The numeral in the parentheses is the isocyanate index.

When the amount of silicone surfactant SH-193 was 0.5 parts, the reaction product contained closed cells too much to be crushed, and further the product shrunk during the cooling and did not form a foam. Further, when the reaction product was exposed to a flame of match, the product was burnt up completely (Comparative Example 5). While, when the amount of silicone surfactant SH-193 was 7.0 parts, a foam was obtained, but the burning test of the foam showed that the foam was flammable (Comparative Example 6).

COMPARATIVE EXAMPLE 7

A polyurethane foam was produced in the same procedure and compounding recipe as described in Example 1, except that 4.4 parts of triethanolamine was used instead of trimethylolpropane of component (B) used in Example 1 and 45.3 parts of tolylene diisocyanate was used and trichloromonofluoromethane (F-11) was not used. The burning test of the resulting foam effected in the same manner as described in Example 1 showed that the foam was flammable.

COMPARATIVE EXAMPLE 8

The procedure of Example 1 was repeated according to the same compounding recipe as described in Example 1, except that 4.4 parts of N,N,N',N'tetrakis(2-hydroxypropyl)-ethylene diamine (trademark: NP-300, made by Sanyo Kasei Co.) was used instead of trimethylolpropane of component (B) used in Example 1 and 42.8 parts of tolylene diisocyanate was used, and trichloromonofluoromethane (F-11) was not used. The resulting product contained closed cells too much to be crushed and shrunk violently not to form a foam. When the foam was exposed to a flame of match, the foam was completely burnt up.

EXAMPLE 13

To 100 parts of poly(oxypropylene) triol GP-3000 as a component (A) were added 3.1 parts of trimethylolpropane as a component (B) which was previously dissolved in 3.0 parts of water, the equivalent weight ratio of the component (B) to the component (A) being 0.7, 0.2 parts of stannous octoate, 0.3 parts of triethylenediamine, 7.0 parts of trichloromonofluoromethane (F-11), 3.0 parts of silone surfactant SRX-274C (a surfactant for semi-rigid polyetherurethane foam, made by Toray Silicone Co.) and 2.0 parts of tris(2,3-dibromopropyl) phosphate (abbreviated as TBPP) as a flame retardant, and the resulting mixture was stirred and mixed throughly for about 30 seconds by means of a stirrer to prepare a homogeneous solution. When the resulting solution was stirred at a high speed together with 45.8 parts (NCO index: 105) of tolylene diisocyanate, a reaction was started, and the reaction mixture became creamy in about 11 seconds. When the creamy mixture was immediately charged into a paper mold, the mixture began to foam, and the rising of foam was completed in about 115 seconds, and a flexible polyurethane foam was obtained.

The results of burning test and smoke test and the physical properties of the above obtained foam are shown as Example 13 (13-1) in the following Table 7.

Further, a flexible polyurethane foam was produced in the same manner as described above, except that the amount of the flame retardant TBPP was varied to 5.0 parts.

Figure 2:
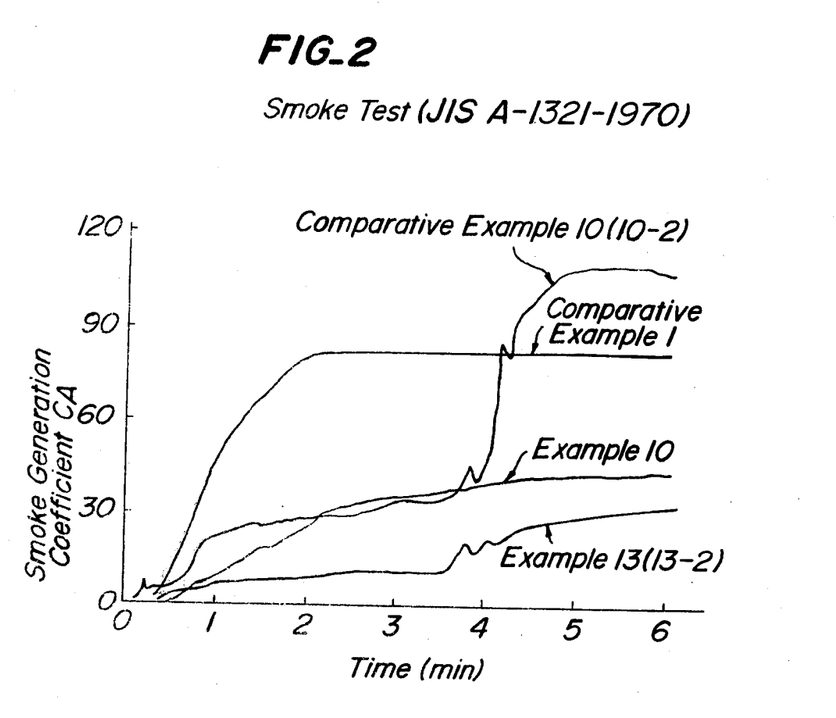
FIG. 2 shows the smoke generation curves of the flexible polyurethane foams (Examples 10 and 13 (13-2)) obtained in the method of the present invention, the conventional general purpose flexible polyurethane foam (Comparative Example 1) and the flexible polyurethane foam (Comparative Example 10) using the conventional flame retardant, which have been determined by the smoke test (JIS A-1321-1970).

The results of burning test and smoke test and the physical properties of the resulting foam are shown as Example 13 (13-2) in Table 7 and in FIG. 2.

EXAMPLE 14

The procedure of Example 13 was repeated, except that 2.0 parts of tris(2,3-dichloropropyl) phosphate (abbreviated as TDCP) was used instead of TBPP, to produce a flexible polyurethane foam of Example 14 (14-1).

Further, the above described procedure was repeated, except that 5.0 parts of TDCP was used, to produce a flexible polyurethane foam of Example 14 (14-2).

The results of burning test and smoke test and the physical properties of the above obtained foams of Example 14 (14-1 and 14-2) are shown in Table 7 together with the results of Example 13.

Table 7

|  | Example 13 | | Example 14 | |
| --- | --- | --- | --- | --- |
|  | 13-1 | 13-2 | 14-1 | 14-2 |
| Compounding recipe (parts) | | | | |
| (A) Triol GP-3000 | 100 | 100 | 100 | 100 |
| (B) Trimethylolpropane | *3.1(0.7) | *3.1(0.7) | *3.1(0.7) | *3.1(0.7) |
| Stannous octoate | 0.2 | 0.2 | 0.2 | 0.2 |
| Triethylenediamine | 0.3 | 0.3 | 0.3 | 0.3 |
| Water | 3.0 | 3.0 | 3.0 | 3.0 |
| Trichloromonofluoromethane (F-11) | 7.0 | 7.0 | 7.0 | 7.0 |
| Silicone surfactant (SRX-274C) | 3.0 | 3.0 | 3.0 | 3.0 |
| TBPP | 2.0 | 5.0 | — | — |
| TDCP | — | — | 2.0 | 5.0 |
| Tolylene diisocyanate (TDI-80) | **45.8(105) | **45.8(105) | **45.8(105) | **45.8(105) |
| Burning test (ASTM D-1692-59T) | non-flammable | non-flammable | non-flammable | non-flammable |
| Smoke test (JIS A-1321-170) | | | | |
| Smoke coefficient $C_{Amax}$ | 36.3 | 33.9 | 62.4 | 54.6 |
| Physical property*** | | | | |
| Density (Kg/m$^3$) | 25.7 | 27.0 | 26.5 | 27.1 |
| ILD (Kg/200 mm$\phi$)$^{25\%}$ | 4.40 | 4.60 | 4.85 | 4.70 |
| $^{65\%}$ | 11.2 | 11.7 | 12.7 | 11.0 |
| Sag factor | 2.55 | 2.53 | 2.61 | 2.34 |

Table 7-continued

|  | Example 13 | | Example 14 | |
| --- | --- | --- | --- | --- |
|  | 13-1 | 13-2 | 14-1 | 14-2 |
| Tensile strength (Kg/cm$^2$) | 0.737 | 0.751 | 0.803 | 0.725 |
| Elongation (%) | 147 | 135 | 132 | 129 |
| Tear strength (Kg/cm) | 0.367 | 0.368 | 0.355 | 0.329 |
| Compression set (%) (50% deflection, 70° C, 22 hours) | 5.27 | 4.82 | 5.78 | 6.47 |
| Resilience (%) | 41 | 41 | 41 | 41 |
| Hysteresis loss (%) | 29.3 | 26.5 | 25.0 | 27.8 |

*The numeral in the parentheses is the equivalent weight ratio of trimethylolpropane of component (B) to the hydroxyl group of triol of component (A).
**The numeral in the parentheses is the isocyanate index.
***Physical property was measured according to JIS K 6301 and K 6401.

COMPARATIVE EXAMPLES 9 AND 10

Flexible polyurethane foams were produced in the same procedure as described in Example 13 according to the compounding recipe shown in the following Table 8, wherein silicone surfactant L-520 was used and a low molecular weight polyhydroxyl compound was not used.

The results of burning test and smoke test and the physical properties of the resulting foams are shown in Table 8.

Secondly, as to the smoke-emission of the resulting foam, the present invention has the following feature. It is clear from the results of smoke tests shown in Tables 7 and 8, and of the smoke generation curves shown in FIG. 2 that the polyurethane foams of the present invention (Examples 10 and 13 (13-2)) are superior to conventional polyurethane foams (Comparative Examples 1 and 10 (10-2)) in the low smoke emission.

That is, the flexible polyurethane foam of the present

Table 8

|  | Comparative Example 9 | | Comparative Example 10 | |
| --- | --- | --- | --- | --- |
|  | 9-1 | 9-2 | 10-1 | 10-2 |
| Compounding recipe (parts) | | | | |
| (A) Triol GP-3000 | 100 | 100 | 100 | 100 |
| Stannous octoate | 0.26 | 0.26 | 0.26 | 0.26 |
| Triethylenediamine | 0.1 | 0.1 | 0.1 | 0.1 |
| Water | 4.2 | 4.2 | 4.2 | 4.2 |
| Silicone surfactant (L-520) | 1.7 | 1.7 | 1.7 | 1.7 |
| TBPP | 5.0 | 15.0 | — | — |
| TDCP | — | — | 15.0 | 25.0 |
| Tolylene diisocyanate (TDI-80) | *53.6(108) | *53.6(108) | *53.6(108) | *53.6(108) |
| Burning test (ASTM D-1692-59T) | flammable | self-extinguishing | flammable | self-extinguishing |
| Smoke test (JIS A-1321-1970) | | | | |
| Smoke coefficient C$_{Amax}$ | 66.9 | 86.4 | 64.8 | 110.7 |
| Density (Kg/m$^3$) | 28.8 | 31.4 | 32.2 | 34.0 |

*The numeral in the parentheses is the isocyanate index.

It can be seen from the above obtained results that the present invention has the following features.

Firstly, as to the flammability in terms of ASTM D-1692-59T of the resulting foam, the present invention has the following feature. As seen from the results of burning test of Example 13 (13-1) and Example 14 (14-1) shown in Table 7, according to the present invention, non-flammable polyurethane foams can be obtained by adding only 2.0 parts, based on 100 parts of polyether polyol, of TBPP or TDCP as a flame retardant. While, when flame-resistant flexible polyurethane foams are produced by a conventional hot cure system reaction, it is necessary to use the above described flame retardant in an amount of as large as 15-25 parts based on 100 parts of polyether polyol as shown by Comparative Examples 9 and 10 in Table 8. Moreover, the flame resistance of the resulting foam is only self-extinguishing and is not non-flammable as shown by Comparative Example 9 (9-2) and Comparative Example 10 (10-2) in Table 8. While, according to the present invention, non-flammable foams can be obtained by adding a conventional flame retardant in a small amount of 2-10 parts in spite of the fact that the present invention is reacted in a hot cure system. It is surprising that the non-flammability can be obtained by adding only 2.0 parts of the flame retardant.

invention is superior to conventional flame-resistant polyurethane foam in both of the flame resistance and low smoke emission. Such flexible polyurethane foam of the present invention having both of the flame resistance and low smoke emission cannot be produced by a conventional hot cure system reaction. Therefore, the present invention is very important for industry.

EXAMPLE 15

A mixture of 100 parts of poly(oxypropylene) triol GP-3000 as a component (A), 3.1 parts of trimethylolpropane as a component (B) which was previously melted at 80° C, the equivalent weight ratio of the component (B) to the component (A) being 0.7, 0.1 parts of stannous octoate, 0.2 parts of triethylenediamine, 3.0 parts of water, 5.0 parts of trichloromonofluoromethane (F-11), 3.0 parts of silicone surfactant SH-193 and 10.0 parts of TBPP was homogeneously mixed. Then 45.8 parts (NCO index: 105) of tolylene diisocyanate TDI-80 was added to the resulting mixture, and a flexible polyurethane foam was produced in the same manner as described in Example 13.

The results of burning test and smoke test and the physical properties of the resulting foam are shown in the following Table 9.

Table 9-continued

| | Example 15 |
|---|---|
| Compounding recipe (parts) | |
| (A) Triol GP-3000 | 100 |
| (B) Trimethylolpropane | *3.1(0.7) |
| Stannous octoate | 0.1 |
| Triethylenediamine | 0.2 |
| Water | 3.0 |
| Trichloromonofluoromethane (F-11) | 5.0 |
| Silicone surfactant (SH-193) | 3.0 |
| TBPP | 10.0 |
| Tolylene diisocyanate (TDI-80) | **45.8(105) |
| Burning test (ASTM D-1692-59T) | non-flammable |
| Smoke test (JIS A-1321-1970) | |
| Smoke coefficient $C_{Amax}$ | 57.6 |
| Physical property | |
| Density (Kg/m$^3$) | 29.9 |
| ILD (Kg/200 mm$\phi$) 25% | 10.3 |
| 65% | 27.8 |
| Sag factor | 2.70 |
| Tensile strength (Kg/cm$^2$) | 0.370 |
| Elongation (%) | 79 |
| Tear strength (Kg/cm) | 0.324 |
| Compression set (%) (50% deflection, 70° C, 22 hrs.) | 7.21 |
| Resilience (%) | 23 |
| Hysteresis loss (%) | 36.2 |

*The numeral in the parentheses is the equivalent weight ratio of trimethylolpropane of component (B) to the hydroxyl group of triol of component (A).
**The numeral in the parentheses is the isocyanate index.

What is claimed is:

1. A method for producing flame- and smoke-resistant flexible polyurethane foam which comprises reacting a polyisocyanate, in the presence of a surfactant, catalysts, and blowing agents with a mixture of:
   A. a polyoxypropylene triol containing secondary hydroxyl group of at least 50 mole % of total hydroxyl content and having a number average molecular weight ranging from 3,000 to 6,000; and
   B. a low molecular weight polyhydroxyl compound selected from trimethylolpropane and glycerin, wherein an equivalent weight ratio of said low molecular weight polyhydroxyl compound (B) to said polyoxypropylene triol (A) being from 0.7 to 1.5 and said surfactant being selected from the group consisting of the surfactants for semi-rigid, rigid polyetherurethane foam, and polyesterurethane foam.

2. The method according to claim 1, in which the polyisocyanate is selected from the group consisting of tolylene diisocyanate, diphenylmethane diisocyanate, diphenyl diisocyanate, chlorophenyl-2,4-diisocyanate, p-phenylene diisocyanate, xylene diisocyanate and polymethylene polyphenylene isocyanate.

3. The method according to claim 2, in which the polyisocyanate is tolylene diisocyanate.

4. A flame- and smoke-resistant flexible polyurethane foam produced by reacting a polyisocyanate, in the presence of a surfactant, catalysts and blowing agents, with a mixture of:
   A. a polyether polyol containing secondary hydroxyl group of at least 50 mole % of total hydroxyl content and having a number average molecular weight ranging from 3,000 to 6,000; and
   B. a low molecular weight polyhydroxyl compound, wherein said surfactant being selected from the group consisting of the surfactants for semi-rigid, rigid polyetherurethane foam, and polyesterurethane foam, an amount of said surfactant being from 0.05 to 5.0 parts by weight per 100 parts by weight of the polyether polyol (A) and an equivalent weight ratio of said low molecular weight polyhydroxyl compound (B) to said polyether polyol (A) being from 0.5 to 2.0.

* * * * *